United States Patent
Azwell et al.

(10) Patent No.: US 9,005,340 B2
(45) Date of Patent: Apr. 14, 2015

(54) FIBER BED ASSEMBLY INCLUDING A RE-ENTRAINMENT CONTROL DEVICE FOR A FIBER BED MIST ELIMINATOR

(71) Applicant: MECS, Inc., Chesterfield, MO (US)

(72) Inventors: Douglas E. Azwell, Maryland Heights, MO (US); Frederick L. Mueller, Herculaneum, MO (US); Steven A. Ziebold, Waterloo, IL (US); Julie Marie Wagner, St. Charles, MO (US)

(73) Assignee: MECS, Inc., Chesterfield, MO (US)

( * ) Notice: Subject to any disclaimer, the term of this patent is extended or adjusted under 35 U.S.C. 154(b) by 163 days.

(21) Appl. No.: 13/644,617

(22) Filed: Oct. 4, 2012

(65) Prior Publication Data

US 2014/0096683 A1    Apr. 10, 2014

(51) Int. Cl.
| | | |
|---|---|---|
| *B01D 45/00* | (2006.01) | |
| *B01D 46/00* | (2006.01) | |
| *B01D 46/24* | (2006.01) | |
| *B01D 46/30* | (2006.01) | |
| *B01D 50/00* | (2006.01) | |

(52) U.S. Cl.
CPC .......... *B01D 46/003* (2013.01); *B01D 46/0031* (2013.01); *B01D 46/0049* (2013.01); *B01D 46/2403* (2013.01); *B01D 46/30* (2013.01); *B01D 50/002* (2013.01)

(58) Field of Classification Search
USPC .............. 95/268; 55/462, 465, 320, 321, 325, 55/327, 445, 446, 413, 414; 96/189, 190, 96/192, 356, 360
See application file for complete search history.

(56) References Cited

U.S. PATENT DOCUMENTS

| | | | | |
|---|---|---|---|---|
| 1,896,833 | A | * | 2/1933 | Bramsen et al. ................ 55/322 |
| 3,747,347 | A | * | 7/1973 | Ciraolo ........................... 60/309 |
| 3,917,458 | A | * | 11/1975 | Polak ............................ 422/169 |
| 4,361,490 | A | | 11/1982 | Saget |
| 4,443,233 | A | | 4/1984 | Moran |
| 5,112,375 | A | | 5/1992 | Brown |
| 5,462,585 | A | | 10/1995 | Niskanen et al. |
| 5,972,171 | A | | 10/1999 | Ross et al. |

(Continued)

FOREIGN PATENT DOCUMENTS

WO       2010071907 A1    7/2010

OTHER PUBLICATIONS

International Search Report in related application PCT/US2013/062634, dated Dec. 5, 2013, 4 pages.

(Continued)

*Primary Examiner* — Dung H Bui
(74) *Attorney, Agent, or Firm* — Senniger Powers LLP

(57) ABSTRACT

A fiber bed assembly used to remove aerosols and/or wetted soluble solids from a moving gas stream includes a fiber bed support and a fiber bed supported by the fiber bed support so that the gas stream passes through the fiber bed moving from an upstream space to a downstream space with respect to the fiber bed. A re-entrainment control device is located within a downstream space defined by the fiber bed so that at least a portion of the gas stream passes through the re-entrainment control device. The re-entrainment control device is shaped to change the direction of the average flow path of the gas stream as the gas stream passes through the re-entrainment control device so as to cause aerosols and/or wettable solids contained therein to be separated from the gas stream by inertial force. A re-entrainment control device and method of use are also disclosed.

16 Claims, 10 Drawing Sheets

(56) References Cited

U.S. PATENT DOCUMENTS

| | | |
|---|---|---|
| 6,190,438 B1 | 2/2001 | Parks |
| 6,391,094 B2 | 5/2002 | Ramos |
| 6,468,321 B2 | 10/2002 | Kinsel |
| 6,630,014 B1 | 10/2003 | Parks |
| 7,266,958 B2 | 9/2007 | Milde et al. |
| 7,445,200 B2 | 11/2008 | Lee et al. |
| 7,857,879 B2 | 12/2010 | Egger |
| 7,927,404 B2 * | 4/2011 | Kemoun .................. 95/269 |
| 2002/0088347 A1 | 7/2002 | Kinsel |
| 2007/0175191 A1 | 8/2007 | Ziebold |

OTHER PUBLICATIONS

Written Opinion in related application PCT/US2013/062634, dated Dec. 5, 2013, 6 pages.

* cited by examiner

FIG. 4B

| Outlet Particle Size (μm) | Inlet Loading (mg/ACF) | Outlet Loading (mg/ACF) | Efficiency without RCD (%) | Outlet Loading with RCD (mg/ACF) | Efficiency with RCD (%) |
|---|---|---|---|---|---|
| 0.2 | 4.6293 | 0.5162 | 88.85% | 0.5120 | 88.94% |
| 0.3 | 2.7773 | 0.0739 | 97.34% | 0.0726 | 97.39% |
| 0.6 | 9.4833 | 0.1384 | 98.54% | 0.1286 | 98.64% |
| 1 | 10.5207 | 0.0383 | 99.64% | 0.0312 | 99.70% |
| 2 | 12.6093 | 0.0184 | 99.85% | 0.0082 | 99.94% |
| 3 | 6.7353 | 0.0029 | 99.96% | 0.0005 | 99.99% |
| 4 | 3.8940 | 0.0001 | 100.00% | 0.0000 | 100.00% |
| 6.5 | 2.9413 | 0.0070 | 99.76% | 0.0000 | 100.00% |
| 10 | 89.0197 | 8.2195 | 90.77% | 0.0000 | 100.00% |
| Total | 142.6103 | 9.0147 | 93.68% | 0.7530 | 99.47% |

FIBER BED ASSEMBLY INCLUDING A RE-ENTRAINMENT CONTROL DEVICE FOR A FIBER BED MIST ELIMINATOR

FIELD OF THE INVENTION

The present invention generally relates to a re-entrainment control device for use downstream from a fiber bed in a fiber bed mist eliminator.

BACKGROUND OF THE INVENTION

Fiber bed mist eliminators have wide industrial application in the removal of aerosols from gas streams. The generation of aerosols ("mist") in gas streams is common in the course of manufacturing processes. Aerosols can be formed, for instance, as a result of mechanical forces (e.g., when a flow including a liquid runs into a structure) that atomize a liquid. Cooling of a gas stream may result in the condensation of vapor to form a mist, and chemical reactions of two or more gases may take place at temperatures and pressures where the reaction products are mists. However the aerosol comes to be in the gas stream, it can be undesirable to inject the aerosol into other processing equipment because the aerosol may be corrosive or otherwise lead to damage or fouling of the processing equipment. Moreover, it can be undesirable to exhaust certain aerosols to the environment. Some of the more frequent applications of fiber bed mist eliminators include removal of acid mists, such as sulfuric acid mists, in acid manufacturing, removal of plasticizer mists in the manufacture of polyvinyl chloride floor or wall coverings and removal of water-soluble solid aerosols from the emissions of ammonium nitrate prill towers. In these various applications, fiber bed mist eliminators may achieve separation efficiencies of 99% or greater depending upon, among other things, the thickness of the fiber bed.

It is generally known that fibers made of various materials may be used to construct fiber beds for fiber bed mist eliminators. The fiber bed is designed to collect fine liquid mist and soluble solid particles entrained in a moving gas stream and drain them through the structure of the bed. Typically, beds of collecting fibers are associated with metal wire screens or similar external support structures. The combination of a bed of collecting fibers and external support structure is known as a fiber bed assembly. As used hereinafter, fiber bed refers to that portion of the fiber bed assembly apart from any such support structure. Fiber beds may be formed by packing bulk fiber between two opposing support screens (bulk-packed beds), pre-forming a tube of fiber bed material, or winding a roving made of fibers around a cylindrical support screen (wound beds). Although not limited to such a configuration, fiber bed assemblies are most often configured in the form of a vertical cylinder. Cylindrical fiber bed assemblies permit a high effective fiber bed surface area in a minimum of space.

In operation, a horizontal stream of gas containing a liquid and/or wetted soluble solid aerosol is made to penetrate and pass through the fiber bed of the fiber bed assembly. The fibers in the fiber bed capture the aerosol in the gas by the mechanisms of impaction, interception, and Brownian diffusion. The captured aerosol coalesces on the fibers to form droplets of liquid in the fiber bed. The moving gas urges the droplets to move toward the downstream face of the fiber bed where the captured liquid exits the fiber bed and drains downward under the force of gravity.

The fibers which make up the fiber bed may be made from a variety of materials. Materials utilized to make bed fiber include, for example, metals such as stainless steel, titanium, etc., fibers of polymeric materials such as polyesters, polyvinylchloride, polyethylene terphthalate, nylons, polyethylene, polypropylene etc., and glass. In applications where corrosive conditions and/or high temperatures are encountered, long staple, chemical grade glass fibers have found particularly widespread use in fiber beds of fiber bed mist eliminators. Fibers ranging in diameter from 5 microns or less to more than 200 microns, as well as combinations of fibers of varying diameters, have been used in fiber beds. The bulk density of prior art fiber beds ranges from about 5 lb/ft$^3$ (80 kg/m$^3$) to greater than 20 lb/ft$^3$ (320 kg/m$^3$), while fiber bed thickness ranges from about 0.5 to about 6 inches (1 to 15 cm) or more, depending upon the desired separation efficiency.

Re-entrainment of collected liquid from the downstream surface of the fiber bed often causes problems. These problems can include any of the following individually or in combination; fouling of downstream process equipment, degradation of product purity, corrosion to ductwork and in some cases difficulty in achieving emission requirements. Re-entrainment in fiber bed separators can arise from two mechanisms. As the liquid drains down through the fiber bed and/or the downstream surface thereof, the moving gas stream can cause some of the draining liquid to break or bubble out of the descending liquid stream and become re-entrained in the gas stream as droplets. This problem is particularly severe at the bottom of a vertically disposed fiber bed since all of the liquid collected by the fiber bed necessarily drains to the bottom and from a practical standpoint because of gas phase drag on the liquid, out the downstream surface at the bottom of the fiber bed. At this disengagement point where the greatest cumulative drainage occurs, gas phase drag can cause bubbling, "spitting", jetting or fragmentation of the draining liquid. As these bubbles break, large to sub-micron sized fragments or droplets are formed which are carried away by the moving gas stream as what is termed "bubble re-entrainment". For example, droplets formed by fragmentation or bubble bursting which could become re-entrained may have a size ranging from 2 to 2,500 microns.

The second re-entrainment mechanism termed "bed re-entrainment" occurs at gas bed velocities so high that gas phase drag on the draining liquid in the entire fiber bed on downstream discharge surfaces of the fiber bed causes bubbling, spitting, jetting and fragmentation into re-entrainment. Thus, in a given fiber bed and at a constant liquid loading, as bed velocity increases, a point is reached where bubble re-entrainment begins. This first occurs at the bottom of the fiber bed on the gas discharge surface of the collecting media. As the bed velocity is increased even further re-entrainment begins to occur at higher levels on the fiber bed until with only minor increases in velocity, re-entrainment is occurring from substantially the entire gas discharge surface of the fiber bed. This is typically referred to as a totally flooded condition.

SUMMARY OF THE INVENTION

In one aspect of the present invention, a fiber bed assembly for use in a mist eliminator for removing aerosols and/or wetted soluble solids from a moving gas stream generally comprises a fiber bed support and a fiber bed is supported by the fiber bed support to define an upstream space and a downstream space. The fiber bed is constructed to pass the gas stream through the fiber bed moving from the upstream space to the downstream space. The fiber bed comprises collecting fiber media and is generally tubular in shape such that downstream surface of the fiber bed defines the downstream space of the fiber bed. A re-entrainment control device is located at least partially within the downstream space, such that at least a portion of the gas stream passes through the re-entrainment control device. The re-entrainment control device is shaped to change the direction of the average flow path of the gas stream as the gas stream passes through the re-entrainment control device so as to cause aerosols and/or wettable solids contained therein to be separated from the gas stream by inertial force.

In another aspect of the present invention, a method of removing aerosol and soluble solids from a gas stream flowing through a fiber bed assembly with reduced re-entrainment generally comprises directing a gas stream through a fiber bed into an interior space defined by the fiber bed so that aerosol and soluble solid in the gas stream are collected by the fiber bed. Collected aerosol and soluble solids are drained within the fiber bed to a drain of the fiber bed assembly. The gas stream from within the interior space of the fiber bed is moved to an outlet in a direction generally perpendicular to the direction the gas stream enters the interior space of the fiber bed and adjacent the outlet has a velocity of at least about 800 feet per minute. The average flow path is redirected as it is being moved within the interior space to the outlet of the fiber bed assembly so as to separate re-entrained aerosols and/or soluble solids from the gas stream by inertial forces thereby to remove re-entrained aerosols and/or soluble solids from the gas stream.

In yet another aspect of the present invention, a re-entrainment control device for use in a fiber bed assembly of a mist eliminator to control re-entrainment of aerosols and soluble solids captured by the fiber bed assembly generally comprises a frame having a longitudinal axis along the longest dimension of the frame and a baffle supported by the frame. The baffle is shaped to change the direction of the average flow path of the gas stream as the gas stream passes through the re-entrainment control device moving generally along the longitudinal axis thereof so as to cause aerosols and/or wettable solids contained therein to be separated from the gas stream by inertial force.

Other objects and features will be in part apparent and in part pointed out hereinafter.

BRIEF DESCRIPTION OF THE DRAWINGS

FIG. 4B is a table showing data which is depicted graphically in FIG. 4A;

Corresponding reference characters indicate corresponding parts throughout the drawings.

DESCRIPTION OF THE PREFERRED EMBODIMENTS

Figure 1:
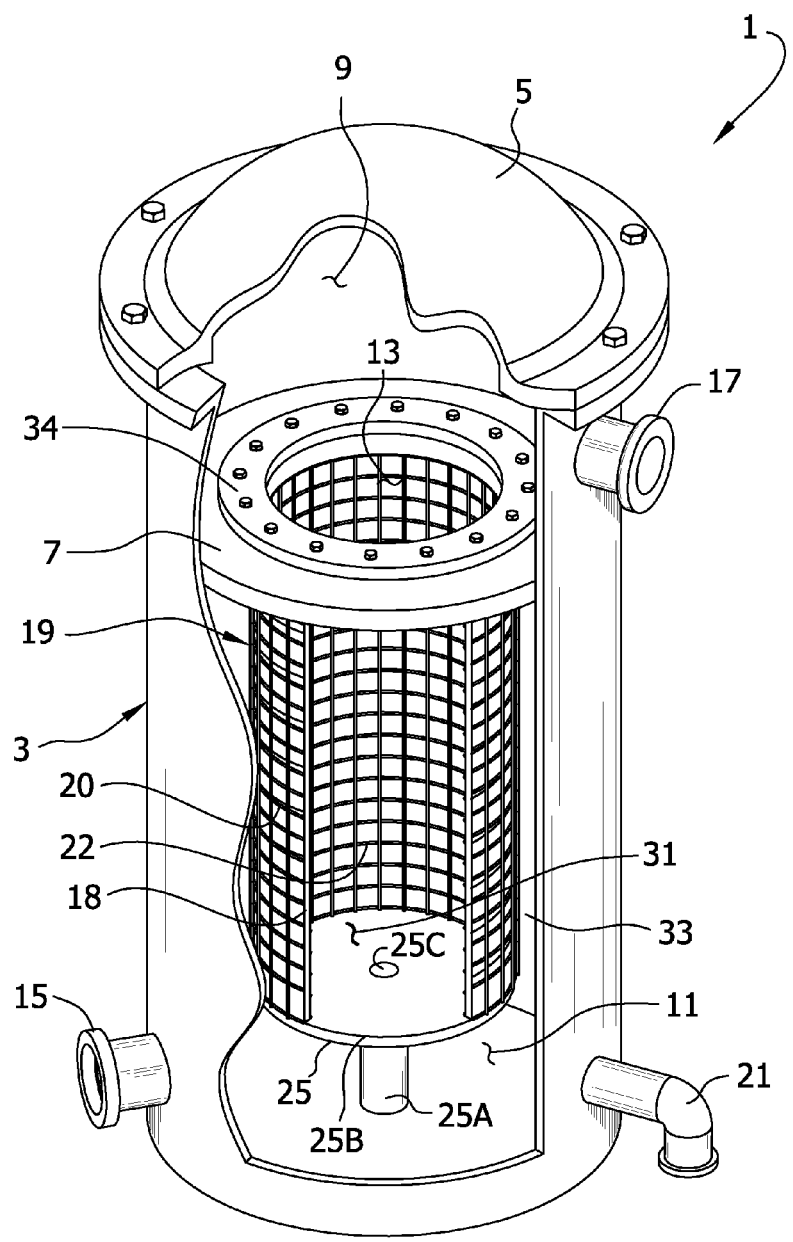
FIG. 1 is a perspective of a mist eliminator with parts broken away to show internal construction.

The present invention is directed to an improved fiber bed mist eliminator comprising a re-entrainment control device located on the downstream side of a fiber bed. The re-entrainment control device has a construction that causes the gas stream to have its average flow path redirected as it travels from the downstream surface of the fiber bed toward the outlet of the mist eliminator.

The mist eliminator of the present invention utilizes a fiber bed separator as the primary de-entrainment medium. Fiber beds are ideal for use in gas streams having a high liquid aerosol content, and are effective at removing a wide range of particulates of various sizes from the gas stream. Generally, as described above, a fiber bed acts to remove particulates from the gas stream in a suitable manner, such as through Brownian diffusion and impaction of those particulates onto its constituent fibers. Particulates captured by the fibers naturally drain downward through the fiber bed under the force of gravity. In the course of draining, some particulates will coalesce on the surface of the fibers to form larger liquid droplets.

Where the fiber bed utilizes fibers having an average fiber diameter less than about 5 µm in diameter, a plurality of stabilizing fibers dispersed interstially within the collecting fiber layer is desirable. Fiber bed embodiments having such stabilizing fibers are disclosed in U.S. Pat. No. 5,605,748, the entirety of which is incorporated herein by reference. To minimize pressure drop while maintaining a desirable separation efficiency, preferred fiber beds for use with the present invention have a void fraction of greater than about 0.89, more preferably between about 0.89 and about 0.96. Fiber beds having a void fraction within the preferred range will further allow the collected liquid droplets to drain more efficiently and with less risk of flooding. However, fiber beds having a void fraction less than 0.89 may be used within the scope of the present invention.

Another index of the performance of a fiber bed that characterizes aerosol collection capabilities is the "net collection targets" or NCT of the fiber bed. The NCT of a fiber bed is defined as the product of the specific fiber surface area of the bed and the bed thickness. In effect, NCT provides an indication of the amount of fiber surface area "seen" by the aerosol ladened gas as it flows through a fiber bed. Generally, a higher NCT value is desired in high efficiency fiber bed applications as it indicates greater availability of fiber surface area for collection of small diameter aerosol particles by the mechanism of Brownian diffusion. Preferred fiber beds for use with the present invention have an NCT greater than about 700.

A re-entrainment control device constructed according to the principles of the present invention may be used in combination with a fiber bed of any design known in the art, and may together form at least part of a "fiber bed assembly." Preferred fiber beds for use with the present invention utilize collecting fibers having an average fiber diameter of less than about 50 µm, less than about 25 µm, less than about 15 µm, or less than about 10 µm in diameter. In a particular embodiment, the fiber bed utilizes collecting fibers having an average fiber diameter less than about 5 µm in diameter. Generally, a smaller average fiber diameter allows for the overall thickness of the fiber bed to be reduced while maintaining a desired separation efficiency. This is desirable because a lower bed thickness relates to a lower pressure drop across the bed, thereby reducing the power requirements necessary to maintain an acceptable flow rate of the gas stream through the mist eliminator. It is to be understood that the construction and operation of the fiber bed may be other than described herein without departing from the scope of the present invention.

Referring now to the drawings and in particular to FIG. 1, a "forward flow" mist eliminator, sometimes also called a "hanging style" mist eliminator, is depicted (generally indicated at 1). Forward flow mist eliminators have particular application for use in gas streams having a high liquid aerosol content to be removed from the gas stream, and are especially preferred for use with gas streams with a significant number of liquid aerosol particles having submicron sizes.

The mist eliminator 1 includes a tank (generally indicated at 3) having a removable lid 5 sealingly attached to the tank to close an open top of the tank. An annular mounting plate 7 within the tank 3 divides the tank into an upper chamber 9 and a lower chamber 11. The tank 3 includes a gas stream inlet 15 for receiving a stream of gas ladened with aerosol and/or wetted soluble solids into the lower chamber 11 of the tank. From the lower chamber 11 ("upstream space"), the gas stream can flow downstream to the upper chamber 9 only by passing through a fiber bed assembly (generally indicated at 19) into a core interior (downstream) space 31 within the fiber bed assembly. From the core interior space 31, the gas stream flows into the upper chamber 9 through a center hole 13 of the annular mounting plate 7. The tank 3 includes a filtered, clean gas stream outlet 17 in fluid communication with the upper chamber 9 in the tank to permit filtered, clean gas to pass out of the mist eliminator 1 to an exhaust or other processing equipment (not shown).

The fiber bed assembly 19, located primarily in the lower chamber 11 of the tank 3, has a generally tubular shape with a bottom closed to the gas stream flow and an open top. The fiber bed assembly 19 may be of any suitable construction. For example, the fiber bed assembly 19 may include a fiber bed 18 formed, for example, as described previously herein, supported by a suitable fiber bed support such as one including an outer cage 20 and an inner cage 22 (FIG. 1). The fiber bed 18 is located between the outer cage 20 and the inner cage 22 in the illustrated embodiment. The fiber bed assembly 19 is sealingly mounted on the mounting plate 7 by way of flange 34, so that an open top of the fiber bed assembly is in registration with the center hole 13 of the mounting plate. Gas cannot flow (barring leakage) from the lower chamber 11 to the upper chamber 9 unless it passes through the fiber bed assembly 19. The mounting plate 7 supports the fiber bed assembly 19 within the tank 3 so that the fiber bed assembly hangs down from the mounting plate. The fiber bed assembly 19 removes a very high percentage of the aerosol and/or wetted soluble solids from the gas stream, which is drained to the bottom of the tank 3. An external drain pipe 21 near the bottom of the tank 3 drains off liquids and/or wetted soluble and dissolved solids that are collected in the bottom of the tank. For example, the fiber bed assembly may be designed for use in high-flow conditions such that the bed velocity is between about 9-31 meters per minute (about 30-100 feet per minute) and the core velocity is between about 244-427 meters per minute (about 800-1,400 feet per minute). Bed velocity refers to the velocity of the gas moving in a substantially horizontal direction as it leaves the downstream or inner surface of the fiber bed 18. Core velocity refers to the velocity of the gas moving in a substantially vertical direction adjacent the open top of the fiber bed assembly 19.

Figure 2:
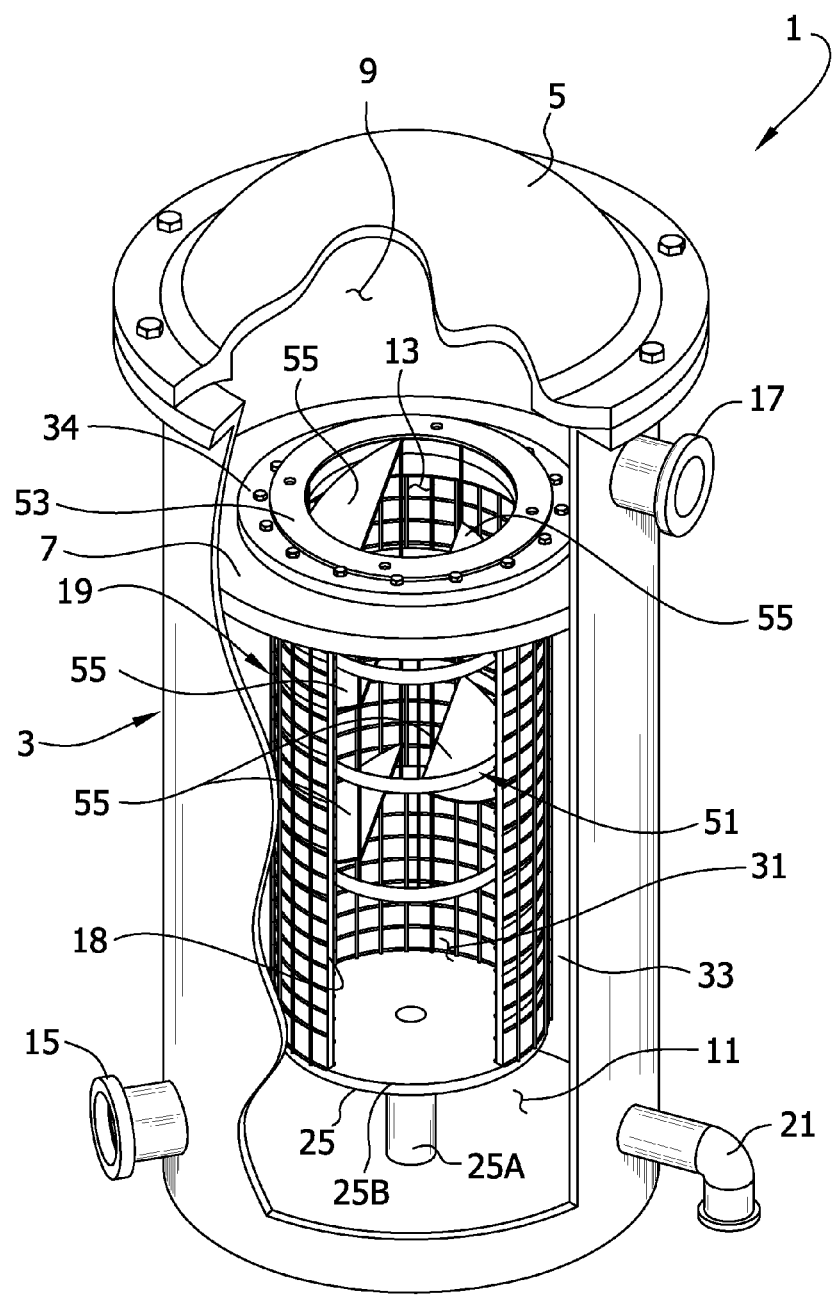
FIG. 2 is the perspective of FIG. 1, but showing a re-entrainment control device located in a fiber bed assembly of the mist eliminator.

FIG. 2 depicts a mist eliminator including a fiber bed assembly of the present invention, in which a re-entrainment control device (generally indicated at 51) is incorporated. In this embodiment, the re-entrainment control device 51 is mounted on the mounting plate 7 via an upper portion 53 that rests on the flange 34 of the fiber bed assembly. The body of the device 51 extends downward through the center hole 13 of the flange 34 into the core interior space 31 located within the fiber bed assembly 19. The gas stream exiting the downstream surface of fiber bed 19 has its average flow path changed several times by the baffles 55, thereby causing liquid re-entrained in the gas stream to separate from the gas by inertial force. Average flow path refers to the average or mean instantaneous direction of all constituents of the gas stream at a particular level along the height of the re-entrainment control device. The re-entrainment control device 51 may be configured for an operating gas flow velocity of between about 457-610 meters per minute (1,500 to 2,000 feet per minute) through the re-entrainment control device. This operating velocity may occur at the same operating conditions (i.e., same bed velocity and core velocity) as described above. The operating velocity is generally higher than the core velocity because the flow area is decreased by the baffles 55. For example, referring to FIG. 3B, the flow area extending horizontally between the inward ends of the baffles 55 and the downstream surface of the fiber bed 19 (FIG. 2) opposite each baffle is smaller than the flow area extending horizontally between two opposite sides of the downstream surface of the fiber bed. The velocity of the gas flow increases as it passes through the flow area extending horizontally between the inward end of a baffle 55 and the opposite side of the downstream surface of the fiber bed 19. For example, in one embodiment, the re-entrainment control device 51 may be configured for an operating gas flow velocity of about 533 meters per minute (1,750 feet per minute). Moreover, the re-entrainment control device 51 may be configured to impart between about 12.7 to 38 mm water column (0.5 to 1.5 inches water column) pressure drop.

The re-entrainment control device 51 may have a height approximately equal to the height of the fiber bed assembly. Alternatively, the re-entrainment control device 51 may be shorter than the cylindrical fiber element as illustrated in the drawings.

Figure 3A:
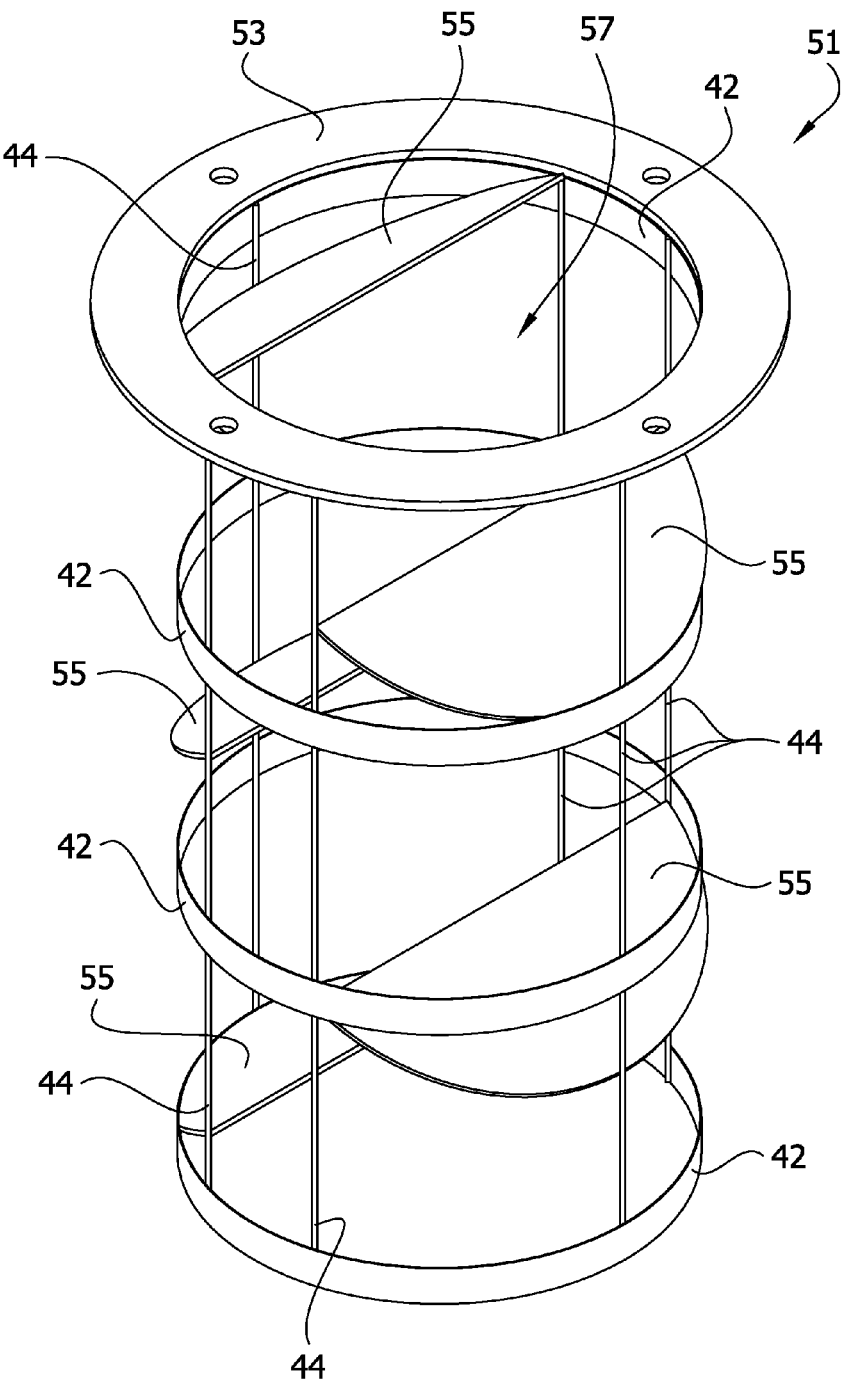
FIG. 3A is an enlarged perspective of a re-entrainment control device including baffles.
Figure 3B:
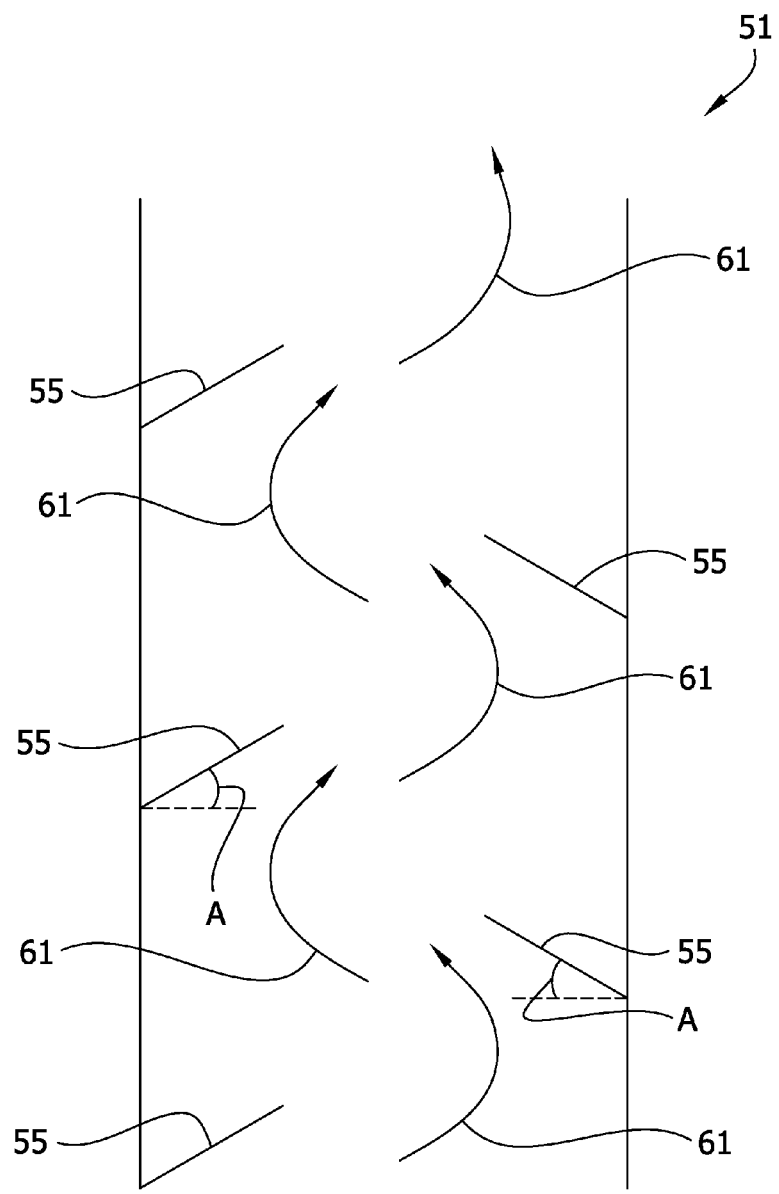
FIG. 3B is a schematic elevation of the re-entrainment control device of FIG. 3A illustrating an example flow path through the re-entrainment control device.

In a particular embodiment of the present invention, the device has a "stepped" or "baffled" configuration. As shown in FIG. 3A, the re-entrainment control device 51) has a generally cylindrical shape. A plurality of baffles 55 are located on alternating, opposite sides of the cylinder along the height of the re-entrainment control device 51. Gas particles entering the device must follow a tortuous path around the baffled vanes before exiting through an upper opening 57. The re-entrainment control device 51 is illustrated schematically in FIG. 3B along with an example gas flow path. Gas flowing upward through the control device 51 may follow a generally S-shaped flow path, as represented by arrows 61, between the baffles 55. Heavier particles and liquids in the gas stream have a larger momentum than the gaseous constituents of the gas stream. The greater inertia of these particles and liquids ("inertial constituents") causes them not to negotiate the forced turns of the gas stream caused by the baffles 55. As a result, these inertial constituents impact the undersides of the baffles 55 or the downstream surface of the fiber bed 18. In either event, the inertial constituents are removed from the gas stream. In particular, the inertial constituents include aerosols and wettable solids that may have been re-entrained by the gas stream from the fiber bed. The tendency of particles and liquids to contact the undersides of the baffles 55 is increased by the decreased flow area adjacent each of the baffles, which, as described above, increases the operating velocity. As the gas flow passes a baffle 55, the velocity of the gas flow increases due to the decreased flow area adjacent the baffle. The increased velocity makes it more likely that particles and liquids will impact the next baffle 55. The restricted flow area adjacent a first baffle 55 causes the gas flow to accelerate into the next or second baffle 55 on the opposite side of the control device 51 above the first baffle.

The inertial constituents recaptured by the fiber bed assembly 19 can be drained from the fiber bed in the usual way. The collected droplets on the undersides of the baffles 55 can coalesce and drip down to the floor 25 of the fiber bed assembly where a drain 25C is located. For example, the collected droplets can coalesce into a film which flows from the undersides of the baffles 55 down the downstream or inner surface of the fiber bed assembly 19 (e.g., the inner cage 22 or inner surface of the fiber bed 18) to the floor 25. Some of the collected droplets may coalesce into larger droplets which may fall from the baffles 55 to the floor 25. The collected droplets are sufficiently large as to avoid being re-entrained by the gas stream. In the illustrated embodiment, the upper portion 53 is a flange sized to facilitate attaching the device to the flange 34 of a fiber bed assembly 19. Thus, the re-entrainment control device can be retrofit to an existing mist eliminator 1. The upper portion 53 forms part of a frame that in the embodiment shown in FIG. 3A includes rings 42 and connecting bars 44 which support the baffles 55 and/or to which the baffles are directly connected such as by welding.

It is contemplated that the number of baffles, and the size thereof, may be freely varied as desired for different applications. The angle at which the blades are inclined may be freely varied, as well as the vertical and horizontal distance between the baffles. The angle and spacing of the baffles may be uniform throughout the device, or it may vary as desired. For example, the baffles 55 may be inclined at an angle A (see FIG. 3B) between 10-50 degrees with respect to horizontal, and more preferably between 15 and 40 degrees with respect to horizontal. In one embodiment the baffles 55 are inclined at an angle A of about 30 degrees with respect to horizontal.

Figure 4A:
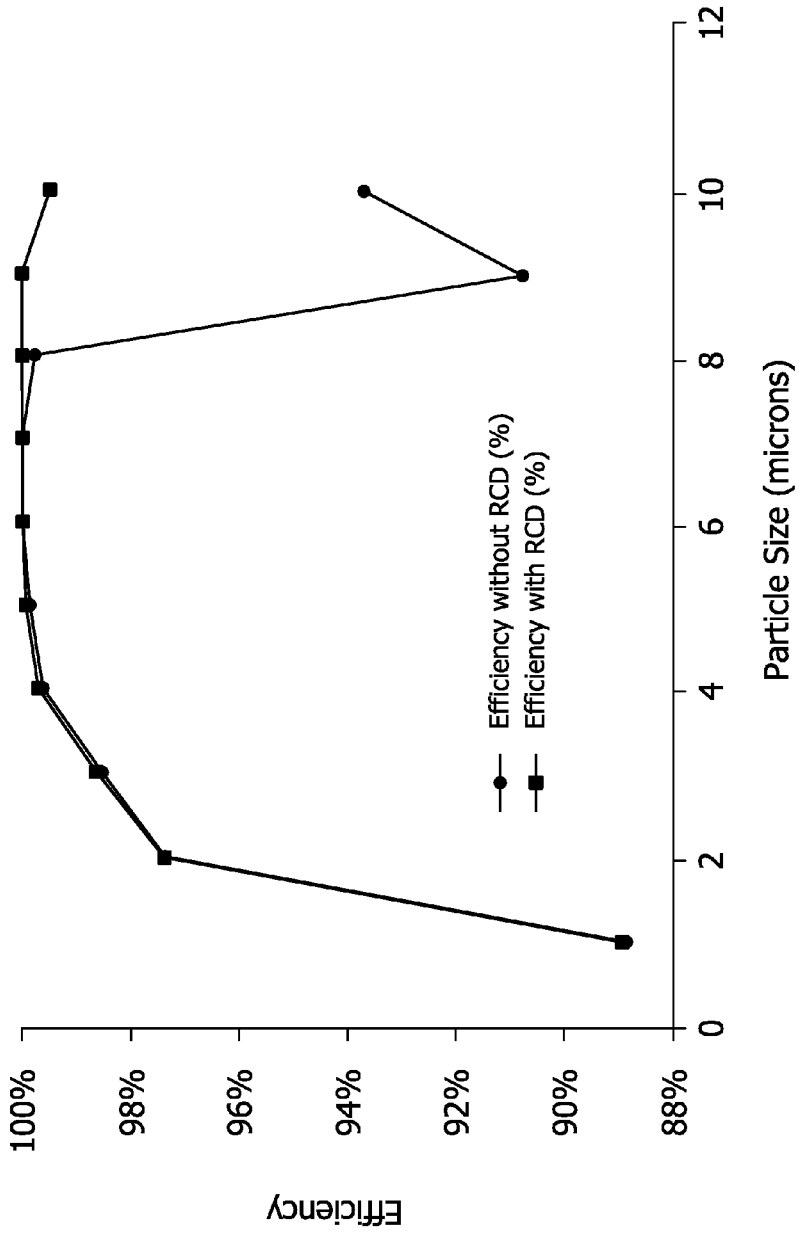
FIG. 4A is a graph showing mist loading and performance in an example test of a re-entrainment control device constructed according to the present invention.

Testing has indicated re-entrainment control devices according to the present invention reduce re-entrainment. In one particular test, a re-entrainment control device essentially the same as the device 51 having baffles 55 was used. Test results including mist load and performance data are shown in graphical form in FIG. 4A and in tabular form in FIG. 4B. A bed velocity of about 14 meters per minute (45 feet per minute) was used. As shown, use of the re-entrainment control device resulted in improved efficiency in reducing re-entrainment of particle sizes ranging from 0.2 to 10 µm. The overall efficiency of the re-entrainment control device was about 91.7%. The improved efficiency for reducing re-entrainment of particles having sizes ranging from 0.2 to 6.5 µm was relatively small, yet an improvement. For example, for particles having a size of 1 µm, efficiency was about 99.6% without the re-entrainment control device, and efficiency was about 99.7% with the re-entrainment control device. However, the re-entrainment control device achieved significant improvements in efficiency for particles having sizes from 8 to 10 µm (see FIG. 4B). For example, for particles having a size of 10 µm, efficiency was about 90.8% without the re-entrainment control device, and efficiency was 100.0% with the re-entrainment control device. It is believed in this test the re-entrainment control device had a much more drastic improvement in efficiency for particles having a size of 8 µm or greater because the size of those particles makes them more susceptible to inertial forces and thus more likely to impact and coalesce on the re-entrainment control device, as described above. These test results are provided by way of example and not limitation. Re-entrainment control devices may be configured to achieve other efficiencies for various particle sizes without departing from the scope of the present invention.

Figure 5:
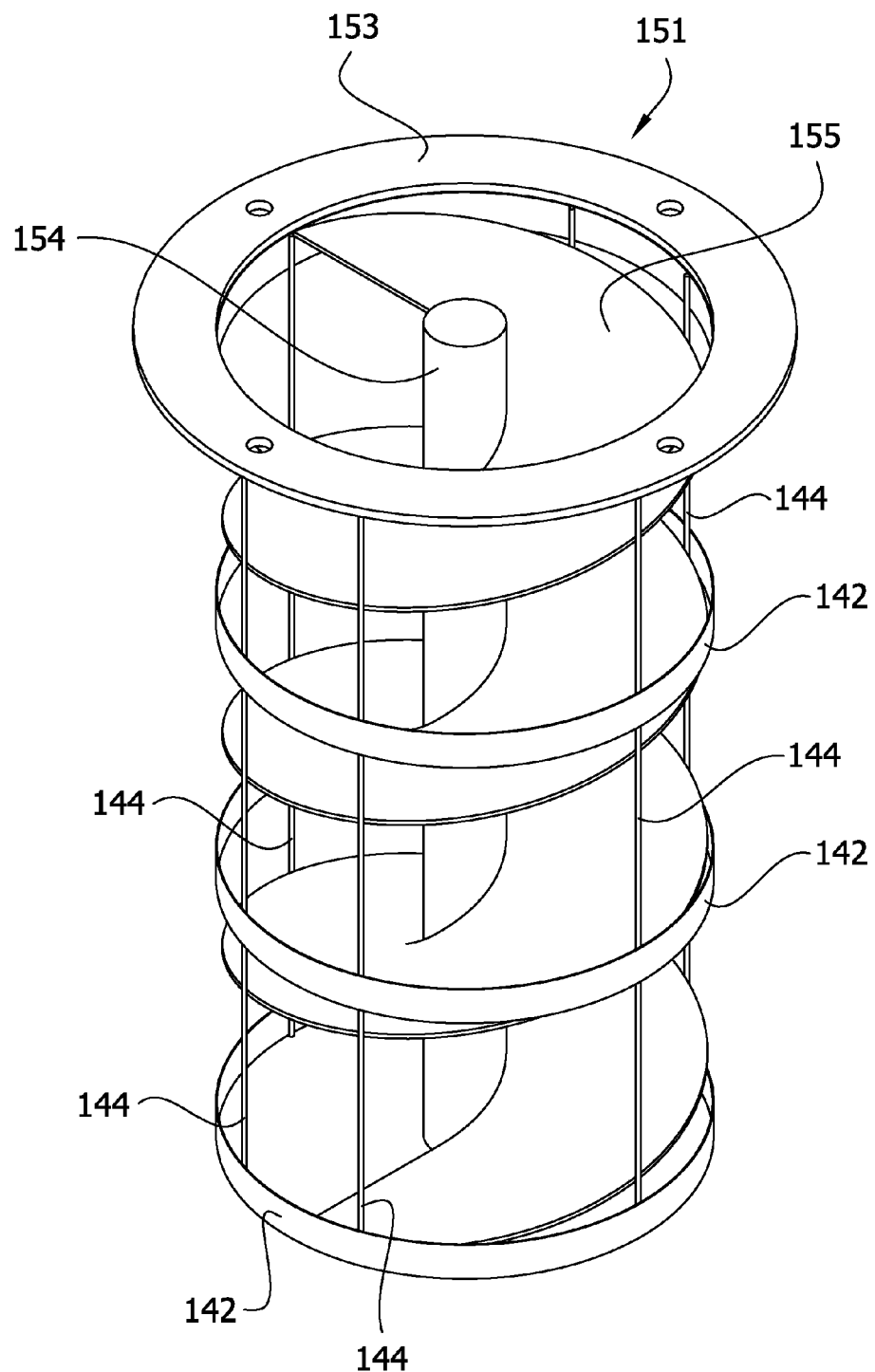
FIG. 5 is an enlarged perspective of a re-entrainment control device of another embodiment having a spiral vane.

In a further embodiment of the present invention, shown in FIG. 5, a re-entrainment control device 151 has a "twisted plate" or "spiral vane" configuration. Parts of the re-entrainment control device 151 of the FIG. 5 embodiment corresponding to the re-entrainment control device 51 of the FIGS. 2 and 3A embodiment are given the same reference number, plus "100." The terms "twisted plate" and "spiral vane" may be used interchangeably in reference to this embodiment. As shown in FIG. 5 the re-entrainment control device includes a baffle in the form of a single, continuous plate is formed or twisted to form a spiral vane 155 around a central core or rod 154. The rod may be omitted without departing from the scope of the present invention. Alternatively, a plurality of blades (not shown) may be attached together and arranged around the central core to form a spiral pattern. In embodiments having a plurality of blades, the blades are preferably overlapping.

Generally, gas exiting the downstream side of the fiber element (not shown in FIG. 5) moves axially upward within the re-entrainment control device 151. The spiral vane 155 causes the gas to flow in a spiral pattern on its way upward toward the outlet of the mist eliminator. In this embodiment, the direction of the average flow path is almost continuously being changed by the spiral vane 155. Without being bound by theory, it is believed that the spiral flow pattern causes liquid re-entrained in the flowing gas to separate from the gas by centrifugal action and impaction on the spiral vane 155 and on the downstream surface of the fiber element. The clean gas continues upward in a spiral fashion. Collected liquid drains downward by gravity, either on the downstream surface of the fiber element, or in a spiral fashion along the upstream (lower) surface of the spiral vane.

The spiral frequency (i.e., turns per unit height) of the spiral vane 155 may vary depending on desired removal efficiency and pressure drop.

Figure 6:
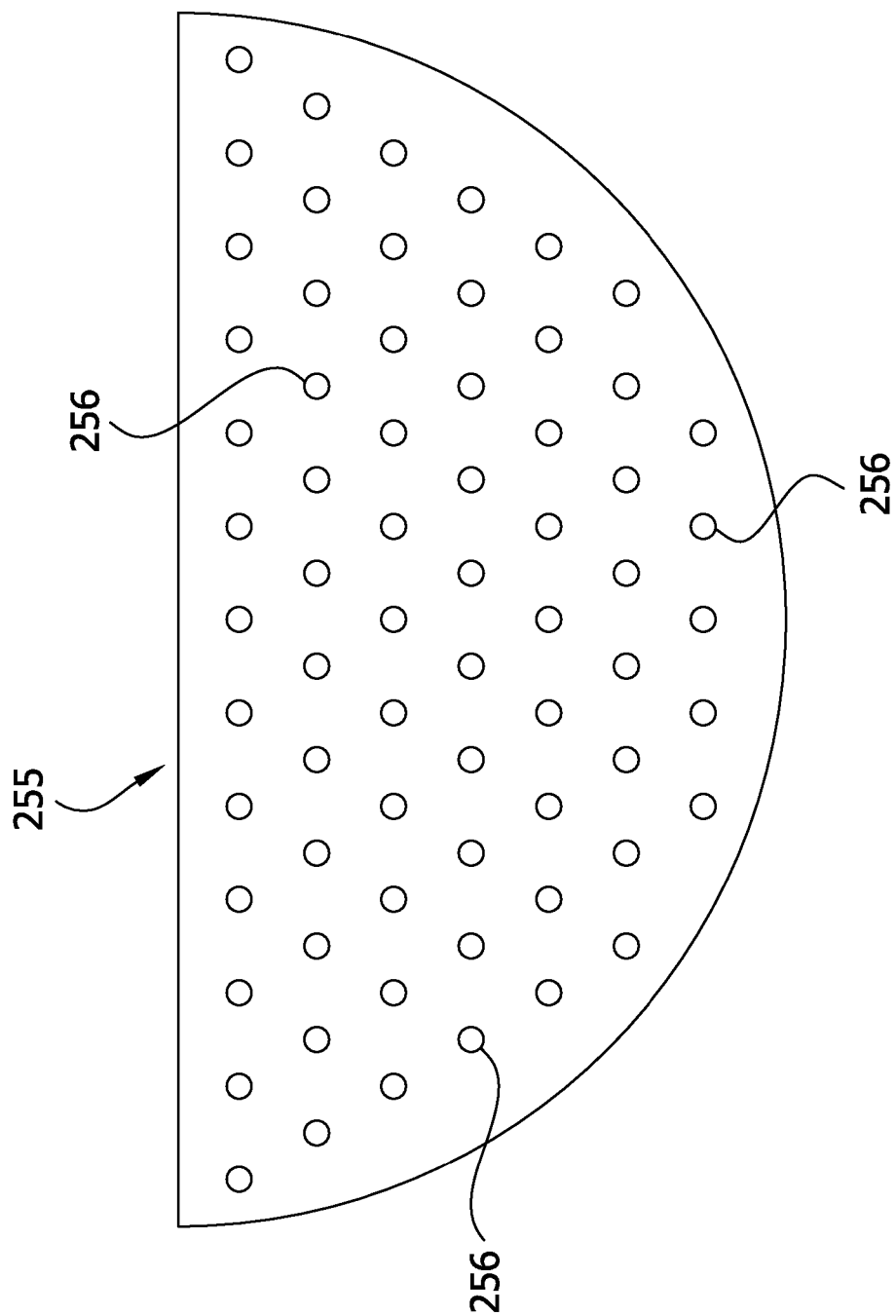
FIG. 6 is an elevation of a baffle similar to the baffles of the FIG. 3A embodiment, but including holes therethrough.

In some embodiments of the re-entrainment control device, the surfaces of the vanes of the re-entrainment control device may be solid. In other embodiments, however, one or more vanes may have openings in the face of the vane. The openings contribute to separation of liquid from the gas stream. The openings may be basic perforations or holes formed through the vane. FIG. 6 depicts the surface of a baffle 255 having a plurality of openings 256. Generally, the presence of openings or perforations in the baffles permit gas moving toward the outlet of the mist eliminator to bypass turns of the spiral path by passing through the openings in the vane. Accordingly, the openings may decrease pressure drop caused by the re-entrainment control device. Moreover, the openings may be configured such that collected liquid can pass through the openings while draining. Sizes, shapes and spacing of the openings may vary as desired for different applications. For example, the size of all openings may be the same, or the openings may vary in size; and the openings may be evenly spaced, or may be variably spaced.

All of the auxiliary features described above may be used with either the stepped baffle device or the spiral vane device. For example, where the spiral vane device has a single, continuous vane, the surface of the vane may be solid, perforated, or have complex openings. The re-entrainment control device of the illustrated embodiments may be constructed as an insert for retrofitting existing mist eliminators and fiber bed assemblies with the re-entrainment control device.

Figure 7:
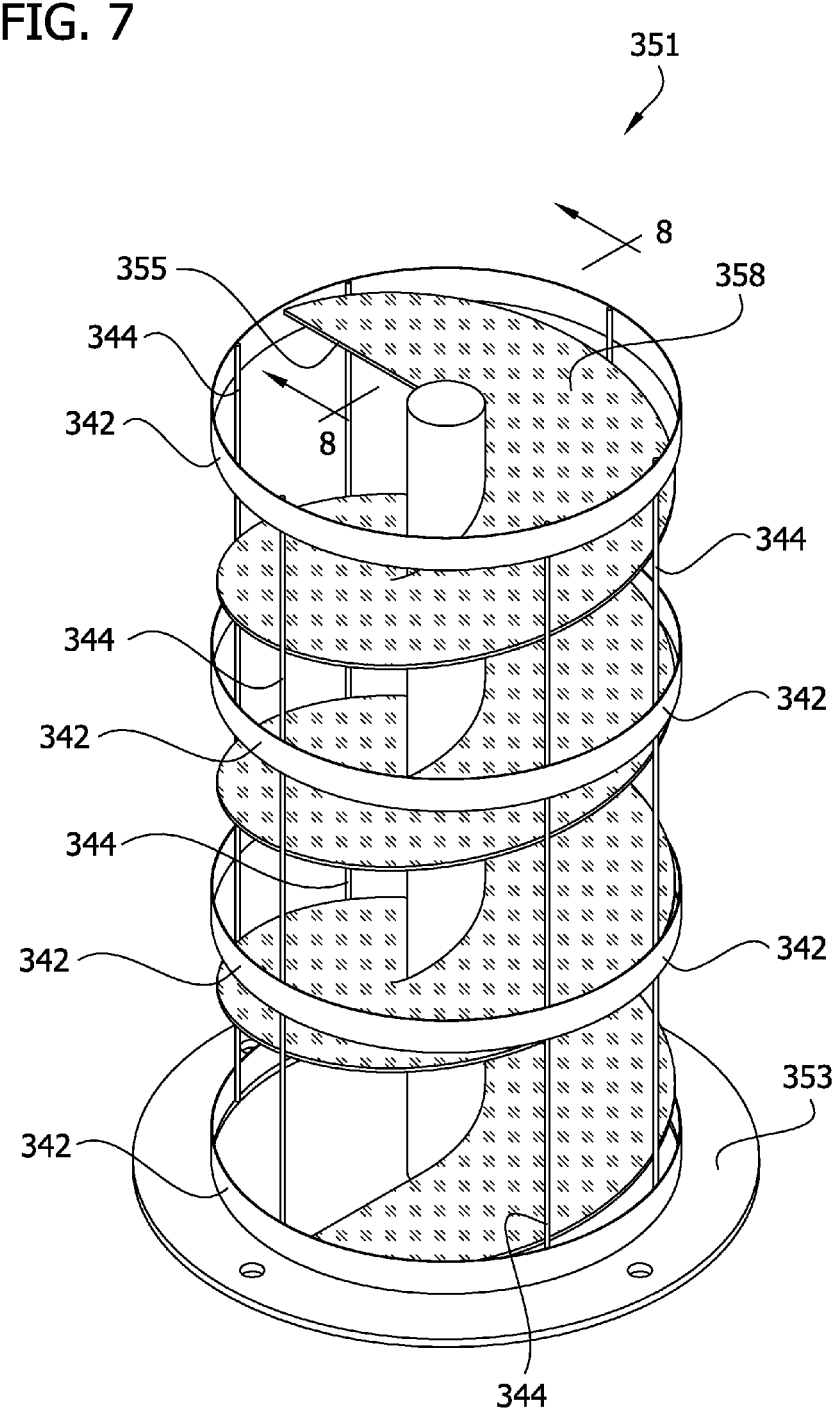
FIG. 7 is a perspective of an inverted re-entrainment control device of yet another embodiment including a gas permeable collection layer on an upstream side of a spiral vane.
Figure 8:
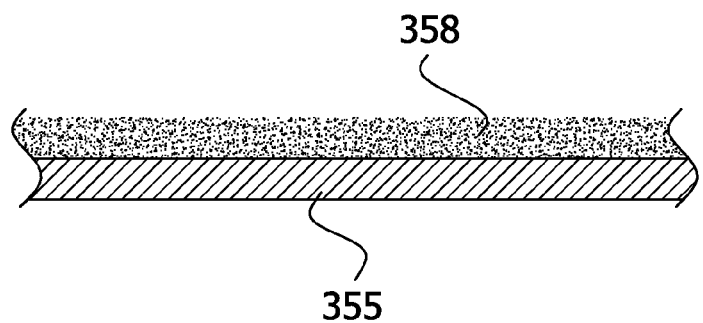
FIG. 8 if a fragmentary section of the spiral vane of the re-entrainment control device taken in the plane including line 8-8 of FIG. 7.

In a further embodiment of the present invention, the device may include a gas permeable collection layer on the upstream surface (underside) of one or more vanes or baffles. These layers improve separation of re-entrained liquid from the flowing gas. For example, FIG. 7 depicts a spiral vane device 351 having a glass fiber layer 358 on the upstream surface of the continuous vane 355. The gas permeable collection layer may take on other configurations besides the glass fiber layer 358. For example and without limitation, the gas permeable collection layer could be a wire mesh (not shown). Parts of the spiral vane device 351 corresponding to parts of the re-entrainment control device of FIGS. 2 and 3A are given the same reference numerals, plus "300." The device is inverted from its normal operating position in FIG. 7 in order to show the glass fiber layer 358 on the upstream surface. An enlarged cross section of the spiral vane 355 is shown in FIG. 8 to better illustrate that the fiber layer 358 is separate from the other metal layer forming the vane. In some embodiments (not shown), one or more vane surfaces having a gas permeable collection layer are perforated. In these embodiments, gas passing through the perforations in the vane must also pass through the gas permeable collection layer, resulting in improved removal of re-entrained aerosol liquid droplets from the gas stream.

Figure 9:
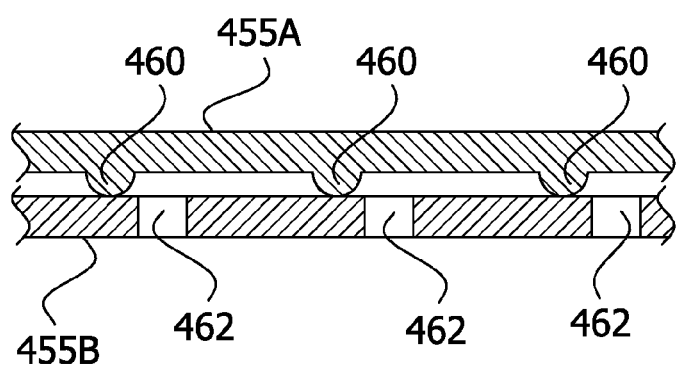
FIG. 9 is a fragmentary section similar to FIG. 8, but showing a dual plate vane construction.

In still another embodiment, a vane or baffle may be formed of two plates as shown in the fragmentary cross section in FIG. 9. At least one of the plates has dimples 460 that contact the other plate 455B to make a space between the plates. Holes 462 in the plate 455B provide access to the space. Holes could be provided in either or both of plates 455A, 455B. Droplets collected in the space between the plates 455A, 455B can flow toward the drain with less influence from the gas stream. Filters or other collecting material (not shown) may be placed between the plates 455A, 455B to further facilitate flow of the collected droplets toward the drain.

Having described the invention in detail, it will be apparent that modifications and variations are possible without departing from the scope of the invention defined in the appended claims. As various changes could be made in the above embodiments without departing from the scope of the invention, it is intended that all matter contained in the above description and shown in the accompanying drawings shall be interpreted as illustrative and not in a limiting sense.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

What is claimed is:

1. A fiber bed assembly for use in a mist eliminator for removing aerosols and/or wetted soluble solids from a moving gas stream, the fiber bed assembly comprising:
   a fiber bed support;
   a fiber bed supported by the fiber bed support to define an upstream space and a downstream space, the fiber bed being constructed to pass the gas stream through the fiber bed moving from the upstream space to the downstream space, the fiber bed comprising collecting fiber media, and the fiber bed being generally tubular in shape such that a downstream surface of the fiber bed defines the downstream space;
   a re-entrainment control device located at least partially within the downstream space, such that at least a portion of the gas stream passes through the re-entrainment control device, the re-entrainment control device being shaped to change the direction of the average flow path of the gas stream as the gas stream passes through the re-entrainment control device so as to cause aerosols and/or wettable solids contained therein to be separated from the gas stream by inertial force, wherein the re-entrainment control device comprises a frame including at least one support member, and spaced apart baffles mounted on the at least one support member in a stepped arrangement to serially change the direction of the average flow path of the gas stream as the gas stream passes each baffle, the stepped arrangement of baffles including baffles on a first side of the downstream space and baffles on a second side of the downstream space opposite the first side, the stepped arrangement of baffles including vertical spaces between successive baffles on the first side of the downstream space, the baffles on the second side of the downstream space being positioned horizontally opposite the vertical spaces between the baffles on the first side of the downstream space.

2. The fiber bed assembly of claim 1 wherein the fiber bed assembly is a hanging style fiber bed assembly.

3. The fiber bed assembly of claim 2 wherein the frame includes an annular flange for hanging the fiber bed assembly.

4. The fiber bed assembly of claim 1 wherein the re-entrainment control device has a longitudinal axis and the baffles are arranged at nonorthogonal angles with respect to the longitudinal axis.

5. The fiber bed assembly of claim 4 wherein the baffles are arranged along a length of the re-entrainment control device, successive baffles along the length of the re-entrainment control device being on opposite sides of the re-entrainment control device.

6. The fiber bed assembly of claim 5 wherein each baffle is positioned with respect to the fiber bed to restrict a flow area within the downstream space adjacent the baffle.

7. The fiber bed assembly of claim 4 wherein successive baffles along the length of the re-entrainment control device are angled in opposite directions.

8. The fiber bed assembly of claim 7 wherein the baffles are inclined at an angle of between 10 and 50 degrees with respect to horizontal.

9. The fiber bed assembly of claim 1 wherein at least one of the baffles has at least one hole therein positioned, sized, and shaped to extract aerosols and soluble solids from the gas stream as it passes through the hole.

10. The fiber bed assembly of claim 1 wherein at least one of the baffles has a gas permeable collecting layer covering at least a portion of an upstream surface of the baffle.

11. The fiber bed assembly of claim 10 wherein the gas permeable collecting layer includes at least one of glass fiber and wire mesh.

12. The fiber bed assembly of claim 1 wherein the fiber bed has a void fraction greater than 0.89.

13. The fiber bed assembly of claim 1 wherein the fiber bed comprises fibers having an average collecting fiber diameter less than about 5 µm in diameter.

14. The fiber bed assembly of claim 1 further comprising a gas permeable collection layer on at least some of the baffles for collecting aerosols and/or wettable solids separated from the gas stream by the re-entrainment control device by inertial force.

15. The fiber bed assembly of claim 1 wherein the vertical spaces between successive baffles on the first side of the downstream space are taller than the baffles on the second side of the downstream space.

16. A method of removing aerosol and soluble solids from a gas stream flowing through a fiber bed assembly with reduced re-entrainment comprising:

directing a gas stream through a fiber bed supported by a fiber bed support into an interior space defined by the fiber bed so that aerosol and soluble solid in the gas stream are collected by the fiber bed, the interior space having a central axis extending parallel to the fiber bed;

draining collected aerosol and soluble solids within the fiber bed to a drain of the fiber bed assembly;

moving the gas stream from within the interior space of the fiber bed to an outlet in a direction generally perpendicular to the direction the gas stream enters the interior space of the fiber bed and at a velocity of at least about 800 feet per minute adjacent the outlet;

moving the gas stream past a stepped arrangement of baffles in which successive baffles in a direction along the central axis of the interior space extend from alternating opposite sides of the interior space so as to separate re-entrained aerosols and/or soluble solids from the gas stream by inertial forces thereby to remove re-entrained aerosols and/or soluble solids from the gas stream.

\* \* \* \* \*